United States Patent
Veghte et al.

(10) Patent No.: US 6,246,409 B1
(45) Date of Patent: Jun. 12, 2001

(54) METHOD AND SYSTEM FOR CONNECTING TO, BROWSING, AND ACCESSING COMPUTER NETWORK RESOURCES

(75) Inventors: William Lewis Veghte, Bellevue; Leonard Thomas Smale, Redmond; Robert M. Price, Seattle, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/366,822

(22) Filed: Aug. 4, 1999

Related U.S. Application Data

(63) Continuation of application No. 08/356,004, filed on Dec. 13, 1994, now Pat. No. 5,953,012.

(51) Int. Cl.[7] .................................................. G06F 17/30
(52) U.S. Cl. ........................ 345/356; 345/340; 345/348; 709/223
(58) Field of Search .................................. 345/356, 340, 345/348; 709/223

(56) References Cited

U.S. PATENT DOCUMENTS

| | | | |
|---|---|---|---|
| 5,166,931 | 11/1992 | Riddle | 370/94.1 |
| 5,500,929 | 3/1996 | Dickinson | 395/160 |
| 5,504,921 | 4/1996 | Dev et al. | 395/800 |
| 5,692,111 | 11/1997 | Marbry et al. | 395/114 |
| 5,721,906 | 2/1998 | Siefert | 395/609 |

OTHER PUBLICATIONS

IBM Corporation, "OS/2 Version 2.0 vol. 3: Presentation Manager and Workplace Shell," International Technical Support Center, Boca Raton, Florida, Apr. 1992, pp. 33–51.

IBM Corporation, "User Defined Views of Folder Objects," *Technical Disclosure Bulletin* 37 (12): 557–558, Dec. 1994.

IBM Corporation, "Method for Browsing Network Resources," *Technical Disclosure Bulletin* 37 (04B):319, Apr. 1994.

(List continued on next page.)

*Primary Examiner*—John A. Follansbee
(74) *Attorney, Agent, or Firm*—Workman, Nydegger & Seeley

(57) ABSTRACT

A method and system for connecting to, browsing, and accessing computer network resources are provided. In a network in which the preferred embodiment of the present invention operates, a client video display includes a container called "Network Neighborhood." The Network Neighborhood provides a constrained view of the network in a NOS-independent manner. The Network Neighborhood provides a constrained view of the network by displaying only those network resources that are determined to be interesting to the user. Further, the Network Neighborhood provides this view in a NOS-independent manner by displaying all of the network resources in a consistent manner, regardless of the type of client software that was used to enumerate or discover the network resources. In the preferred embodiment of the present invention, each type of client software installed on a client determines a list of network resources that are interesting to the user. The combination of these lists of network resources is initially included in the Network Neighborhood. The user (or the user's administrator) can then determine that additional network resources are interesting to the user and can add these resources to the Network Neighborhood. Once the network resources that have been determined to be interesting to the user have been included in the Network Neighborhood, the user can browse and access these resources through the Network Neighborhood.

32 Claims, 8 Drawing Sheets

OTHER PUBLICATIONS

IBM Corporation, "Resources View for User Accounts," *Technical Disclosure Bulletin 35* (6): 263–264, Nov. 1992.

Debets, Marcel, "De Eerste Beta Van Windows '95," *Computer!Totaal* 3(10):52–53, 55–58, 60, 62–63, 65, 66, Oct. 1994.

"Microsoft® Windows™ for Workgroups Resource Kit," Complete Technical Information for the Support Professional for Microsoft Windows for Workgroups, Version 3.1, Microsoft Corporation, 1992, pp. 7–1 to 7–21.

Bierer, Doug, et al., "NetWare 4 for Professionals," New Riders Publishing, Indianapolis, Indiana, 1993, Chapter 9—pp. 343–374; Chapters 12 and 13—pp. 407–443 and Chapter 20—pp. 815–901.

"Windows NT™ Networking Guide," Microsoft Windows NT Resource Kit for Windows NT Workstation and Windows NT Server Version 3.5, 1995, Chapter 1—pp. 3–30, Chapter 2—pp. 31–43 and Chapter 3—pp. 45–52.

Krochmal, Jim, et al., "Banyan VINES: The Professional Reference," New Riders Publishing, Indianapolis, Indiana, 1994, pp. 233–243, 315–346.

METHOD AND SYSTEM FOR CONNECTING TO, BROWSING, AND ACCESSING COMPUTER NETWORK RESOURCES

RELATED APPLICATION

This application is a continuation of U.S. patent application Ser. No. 08/356,004 filed Dec. 13, 1994, now U.S. Pat. No. 5,953,012, entitled "Method and System for Connecting to, Browsing, and Accessing Computer Network Resources," which is incorporated herein by reference.

BACKGROUND OF THE INVENTION

1. The Field of the Invention

This invention relates generally to computer networks and, more particularly, to a method and system for connecting to, browsing, and accessing computer network resources.

2. The Prior State of the Art

Computer networks enable users of computer systems to share the computer systems' resources. These resources include files, printers, and other devices. In a network, computers that share their resources are known as servers and computers that use the shared resources are known as clients. Network software enables clients and servers to communicate with one another. Network software generally includes two types of software: (1) server software that runs on the server to enable the server to accept and process requests to use a resource on the server (this server software is commonly referred to as a network operating system or "NOS") and (2) client software that runs on the client to enable the client to properly request and use the server resource.

Networks are becoming increasingly larger. More resources are being provided on networks and more people are using these network resources. In addition, networks are becoming increasingly more complex. A variety of companies now produce NOSs and client software. Some of the more commonly available NOSs include "WINDOWS NT" and "WINDOWS FOR WORKGROUPS" by Microsoft Corporation and "NETWARE VERSION 3.11" and "NETWARE VERSION 4.01" by Novell Inc. Some of the more commonly available corresponding types of client software include "CLIENT FOR MICROSOFT NETWORKS" by Microsoft Corporation and "NETWARE CLIENT FOR DOS/WINDOWS" by Novell Inc. Each type of client software may provide a different method for enumerating or discovering resources on the network, such as servers running a particular NOS or a particular set of NOSs. Moreover, a typical network may include servers running more than one NOS and a typical client may include more than one type of client software in order to access all of the servers on the network.

As a result of the increasing size and complexity of networks, connecting to, browsing, and accessing network resources is becoming more difficult. In order to find and use a particular network resource, a user may have to browse through many different network resources. Further, the user may need to have an understanding of the particular type of client software that was used to enumerate or discover the network resource.

For example, the steps required to access a file on a common prior art network are illustrated in FIG. 1. In step 110, the user's computer system displays a list of the types of client software installed on the client. In step 120, the user selects a particular type of client software. In step 130, the computer system displays a list of resources enumerated or discovered by the selected type of client software. In step 140, the user selects a particular resource, such as a computer. In step 150, the computer system displays a list of directories or folders available on the selected computer. In step 160, the user selects a particular directory or folder. In step 170, the computer system displays a list of files available in the selected directory or folder. In step 180, the user selects a particular file. In step 190, the computer system finally retrieves the selected file for the user. As can be seen from this example, merely locating and accessing a file on a network is not always an easy process.

While the size and complexity of networks is increasing, users of networks are demanding greater ease of use from computer systems. Users want to access files and use printers, they do not want to be concerned with whether the files are stored on a "WINDOWS NT" server or a "NETWARE VERSION 3.11" server or whether the print server is a "WINDOWS FOR WORKGROUPS" server or a "NETWARE VERSION 4.01" server. Thus, a mechanism for enabling users to more easily connect to, browse, and access network resources is desired.

SUMMARY OF THE INVENTION

One aspect of the present invention provides a method and system for connecting to, browsing, and accessing computer network resources. In a network in which the preferred embodiment of the present invention operates, a client video display includes a container called "Network Neighborhood." The Network Neighborhood provides a constrained view of the network in a NOS-independent manner. The Network Neighborhood provides a constrained view of the network by displaying only those network resources that are determined to be interesting to the user. Further, the Network Neighborhood provides this view in a NOS-independent manner by displaying all of the network resources in a consistent manner, regardless of the type of client software that was used to enumerate or discover the network resources. In the preferred embodiment of the present invention, each type of client software installed on a client initially determines a list of network resources that are interesting to the user. The combination of these lists of network resources is included in the Network Neighborhood. The user (or the user's administrator) can then determine that additional network resources are interesting to the user and can add these resources to the Network Neighborhood. Once the network resources that have been determined to be interesting to the user have been included in the Network Neighborhood, the user can browse and access these resources through the Network Neighborhood.

DETAILED DESCRIPTION OF THE PREFERRED EMBODIMENTS

Figure 2:
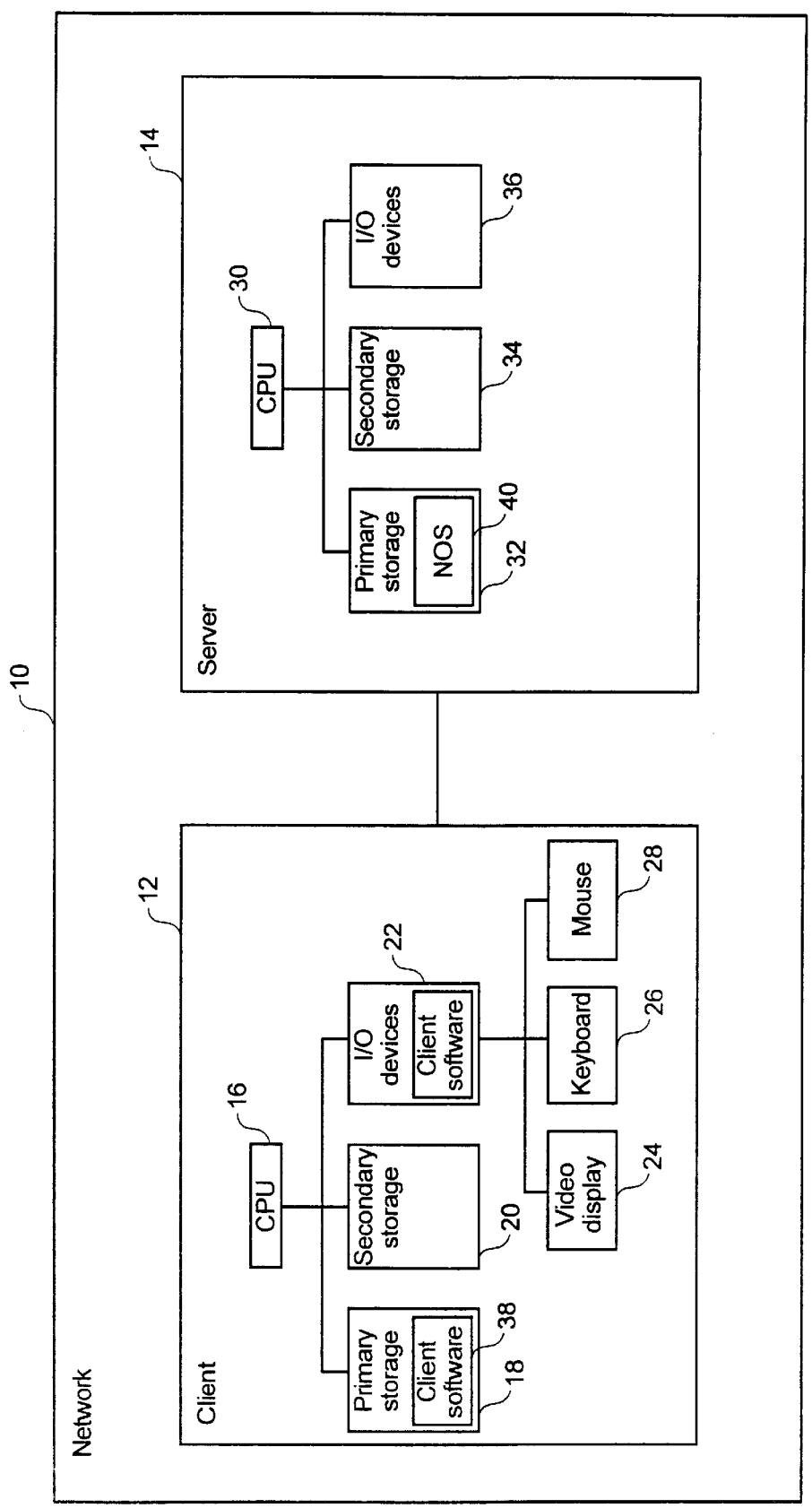
FIG. 2 is a schematic view of a network in which the preferred embodiment of the present invention operates.

The preferred embodiment of the present invention provides a method and system for connecting to, browsing, and accessing computer network resources. A network 10 in which the preferred embodiment of the present invention operates is illustrated in FIG. 2. The network 10 includes a client 12 and a server 14. The client 12 includes a central processing unit ("CPU") 16, a primary storage 18, a secondary storage 20, and input/output ("I/O") devices 22. Typical I/O devices include a video display 24, a keyboard 26, and a mouse 28. Similarly, the server 14 includes a CPU 30, a primary storage 32, a secondary storage 34, and I/O devices 36. Client software 38 is stored in the primary storage 18 of the client 12 for execution by the CPU 16 and a NOS 40 is stored in the primary storage 32 of the server 14 for execution by the CPU 30. One of ordinary skill in the art will appreciate that the network 10 may include any number of clients and servers. The present invention is being illustrated with only one client and one server for the sake of simplicity. Each additional client and server would include components similar to those described above for the client 12 and the server 14.

Figure 3:
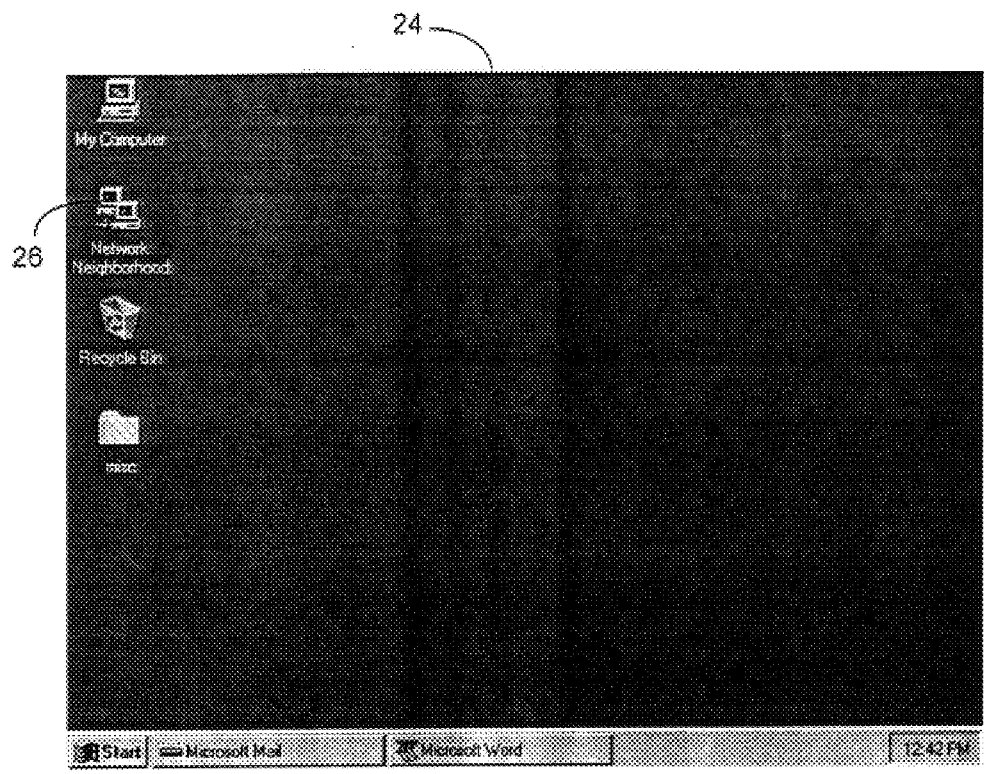
FIG. 3 is a video display showing an icon labeled Network Neighborhood.

The client's video display 24 is shown in detail in FIG. 3. The video display 24 includes an icon 26 labeled "Network Neighborhood." The Network Neighborhood is a container that provides a constrained view of the network in a NOS-independent manner. The Network Neighborhood provides a constrained view of the network by displaying only those network resources that are determined to be interesting to the user. Further, the Network Neighborhood provides this view in a NOS independent manner by displaying all of the network resources in a consistent manner, regardless of the type of client software that was used to enumerate or discover the network resources.

Figure 4:
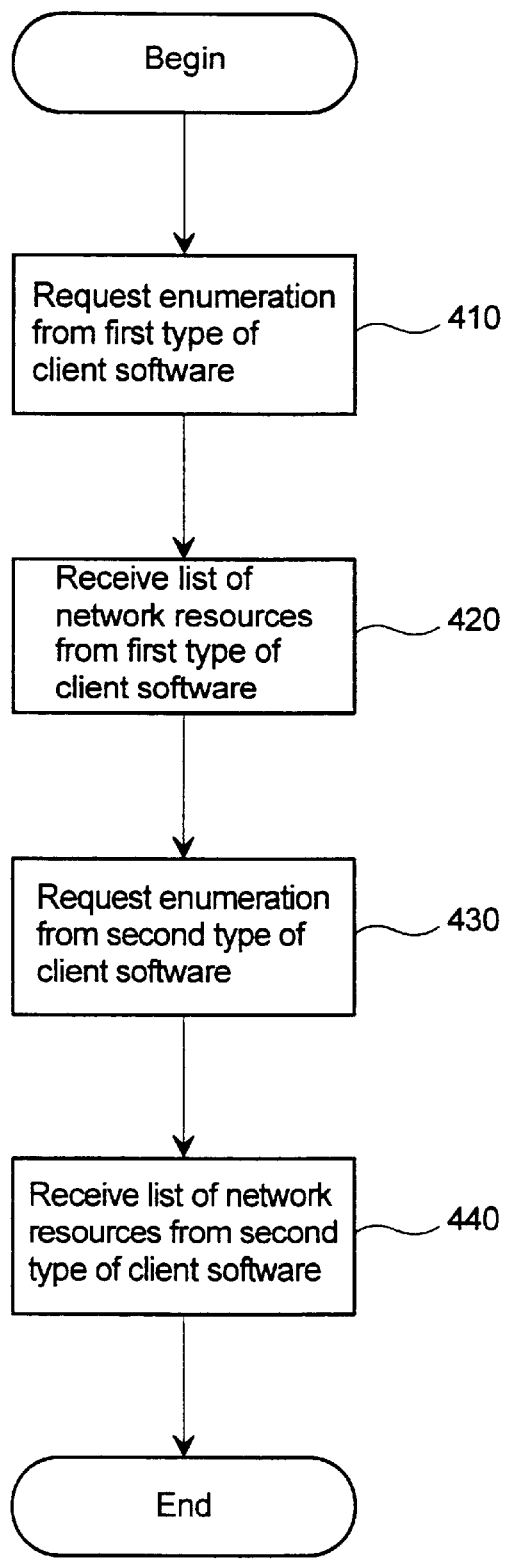
FIG. 4 is a high-level flowchart illustrating the process of determining which network resources to initially include in the Network Neighborhood.

In the preferred embodiment of the present invention, each type of client software installed on the client initially determines a list of network resources that are interesting to the user. The combination of these lists of network resources is included in the Network Neighborhood. The process of determining which network resources to initially include in the Network Neighborhood is illustrated in FIG. 4. In step 410, the client requests enumeration or discovery from a first type of client software, e.g., "CLIENT FOR MICROSOFT NETWORKS." In step 420, the first type of client software returns a list of network resources, e.g., "CLIENT FOR MICROSOFT NETWORKS" would return a list of computer's in the user's workgroup. In step 430, the client requests enumeration or discovery from a second type of client software, e.g., "NETWARE CLIENT FOR DOS/WINDOWS." In step 440, the second type of client software returns a list of network resources, e.g., "NETWARE CLIENT FOR DOS/WINDOWS" would return a list of computers to which the user is connected and authenticated. The above steps would be repeated for each type of client software installed on the client. The combination of the lists of network resources returned from each type of client software is included in the Network Neighborhood.

In an alternative embodiment, each type of client software initially determines which network resources are interesting to the user based upon the network resources most recently used by the user. In another alternative embodiment, each type of client software initially determines which network resources are interesting to the user based upon the network resources most frequently used by the user.

After each type of client software installed on the client has initially determined which network resources are interesting to the user, the user (or the user's administrator) can determine that additional network resources are interesting to the user and can add these resources to the Network Neighborhood. For example, if a user commonly uses an additional computer that is not enumerated or discovered by any type of client software installed on the client1 the user can add the computer to the Network Neighborhood. One technique for adding a network resource to the Network Neighborhood is dragging and dropping an icon representing the resource onto the Network Neighborhood. Dragging and dropping an icon is accomplished by moving a mouse pointer on top of the icon on the video display, pressing down on a mouse button, moving the mouse pointer to a new location on the video display while holding down the mouse button, and then releasing the mouse button. Another technique for adding a network resource to the Network Neighborhood is creating a custom container that includes all of the network resources that are to be added to the Network Neighborhood. Then, when each type of client software determines which network resources are interesting to the user (as described above), the network resources included in the custom container are added to the Network Neighborhood.

Figure 5:
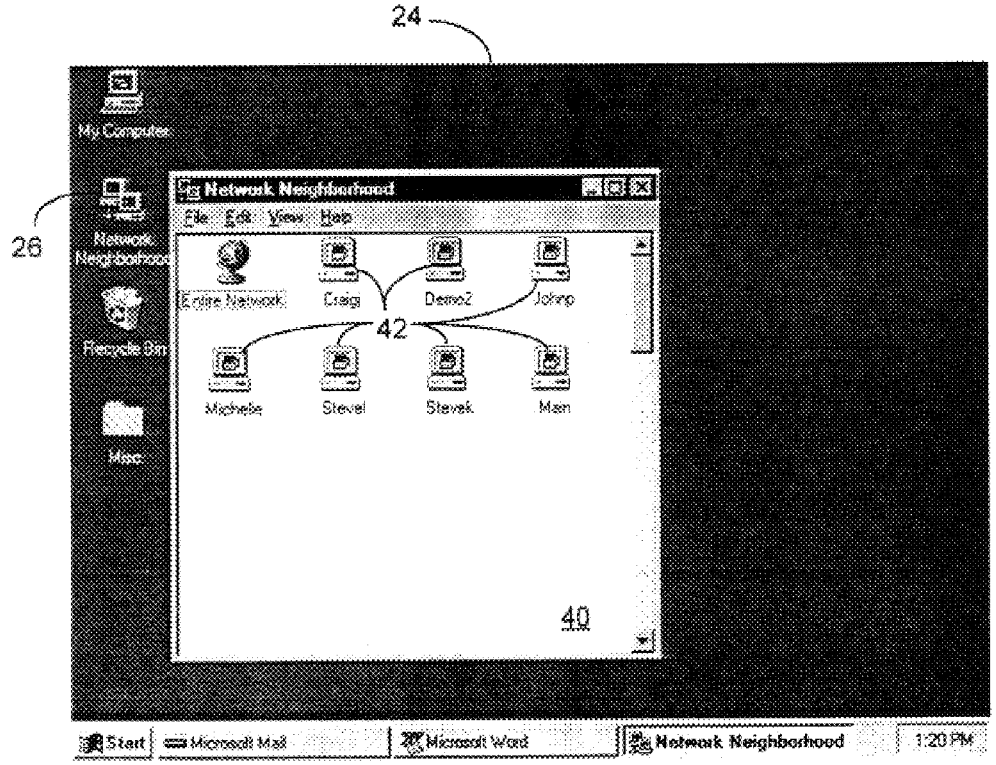
FIG. 5 is a video display showing a Network Neighborhood window that is displayed when a user selects the Network Neighborhood icon in FIG. 3.

FIG. 5 shows a window 40 that is displayed in the video display 24 when the user selects the Network Neighborhood. The user can select the Network Neighborhood by double-clicking on the icon 26 in FIG. 3 that represents the Network Neighborhood. Double-clicking on an icon is accomplished by pressing and releasing the mouse button twice without moving the mouse while the mouse pointer is on top of the icon on the video display. Window 40 includes the network resources, i.e., computers 42, that each type of client software determined were interesting to the user. As discussed above in detail, the computers 42 could include servers from a variety of NOSs. For example, Aliceg might be a "WINDOWS NT" server, whereas Annmc might be a "NETWARE 3.11" server.

Figure 6:
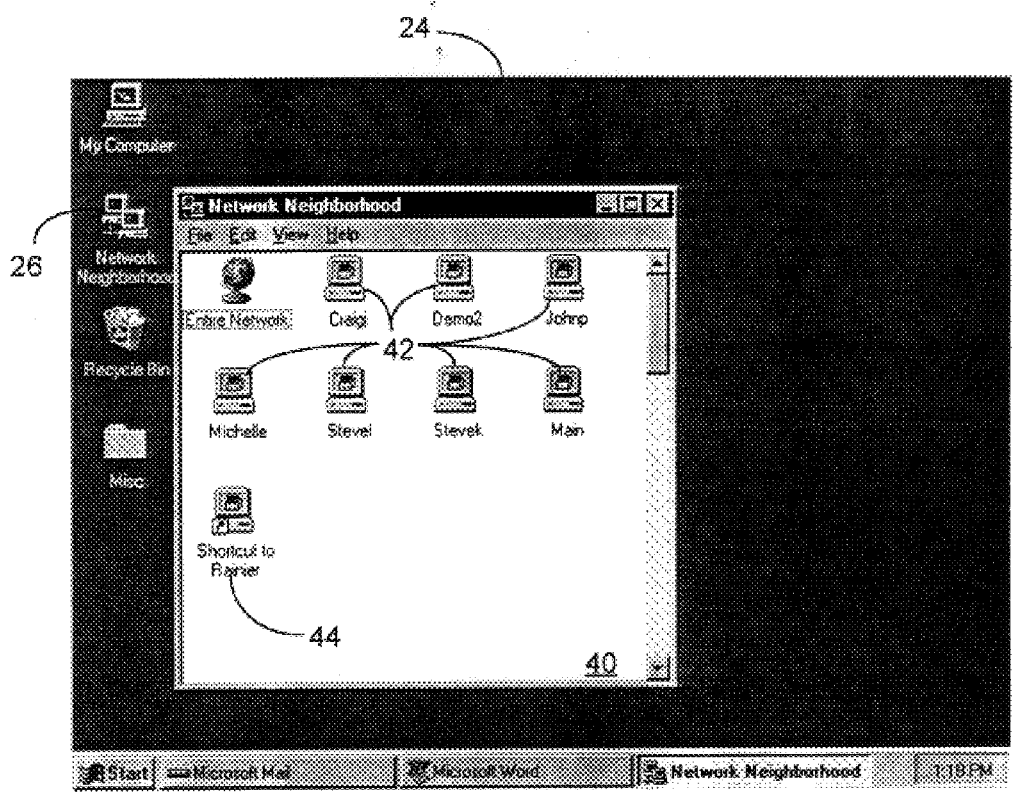
FIG. 6 is a video display showing the Network Neighborhood window of FIG. 5 after the user has added an additional computer to the Network Neighborhood.
Figure 7:
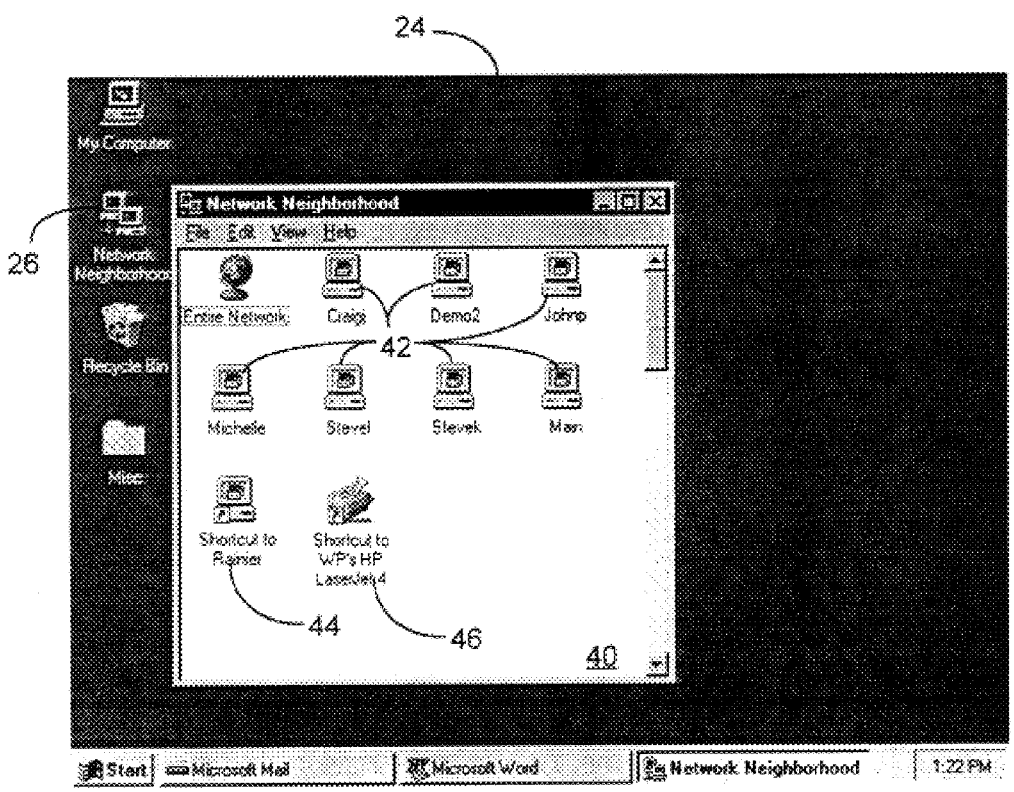
FIG. 7 is a video display showing the Network Neighborhood window of FIG. 5 after the user has added a printer to the Network Neighborhood.
Figure 8:
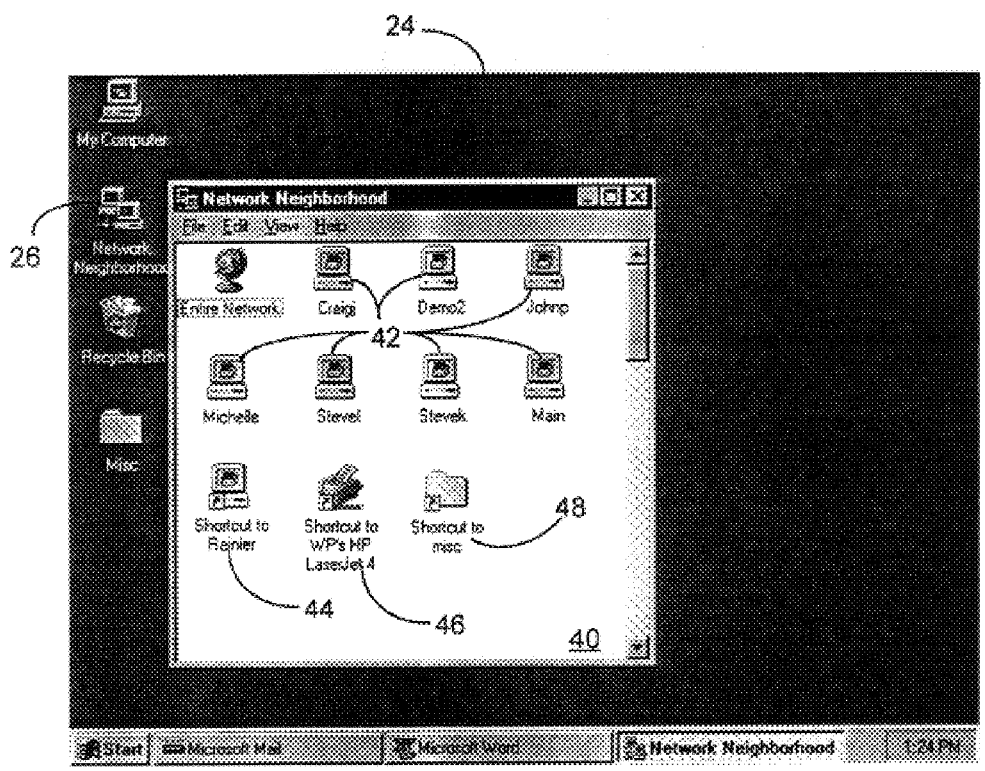
FIG. 8 is a video display showing the Network Neighborhood window of FIG. 5 after the user has added a folder to the Network Neighborhood.
Figure 9:
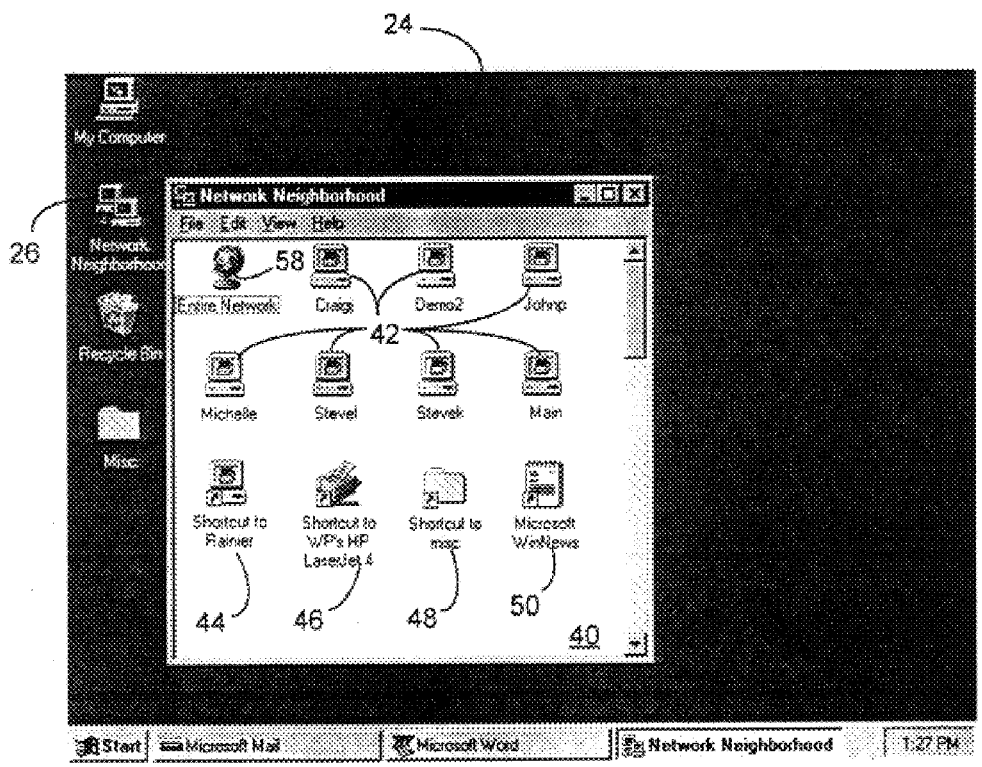
FIG. 9 is a video display showing the Network Neighborhood window of FIG. 5 after the user has added a file to the Network Neighborhood.

FIGS. 6–9 show video display 24 and, in particular, window 40 after the user (or the user's administrator) has customized the Network Neighborhood by adding network resources that the user (or the user's administrator) determined were interesting to the user. Specifically, FIG. 6 shows window 40 after an additional computer 44 has been added to the Network Neighborhood, FIG. 7 shows window 40 after a printer 46 has been added to the Network Neighborhood, FIG. 8 shows window 40 after a folder 48 has been added to the Network Neighborhood, and FIG. 9 shows window 40 after a file 50 has been added to the Network Neighborhood.

With the Network Neighborhood, connecting to, browsing, and accessing network resources is easier. The Network Neighborhood displays a visual representation (i.e., an icon) in the Network Neighborhood window for each of the network resources that have been determined to be interesting to the user. All of the icons representing a particular type of network resource have a consistent visual representation, regardless of the type of client software that was used to enumerate or discover the network resource. For example, all computers are represented by an icon that resembles a computer, all printers are represented by an icon that resembles a printer, all folders are represented by an icon that resembles a folder, and all files are represented by an icon that resembles a document. Additionally, all of the icons representing the network resources are grouped together in the Network Neighborhood window using means other than the type of client software that was used to enumerate or discover the network resources. For example, all computers may be grouped together, all printers may be grouped together, all folders may be grouped together, and all files may be grouped together. The user can browse the network resources by simply looking through the displayed icons.

When the user desires to access a particular network resource, the user can simply double-click on the icon representing the resource. If the selected network resource is a computer, the Network Neighborhood displays the network resources available on that computer (e.g., printers, folders, files) and the user can further select one of these resources; if the selected network resource is a folder, the Network Neighborhood displays the network resources available in that folder (e.g., subfolders, files) and the user can further select one of these resources; if the selected network resource is a file, the Network Neighborhood retrieves the file.

Figure 1:
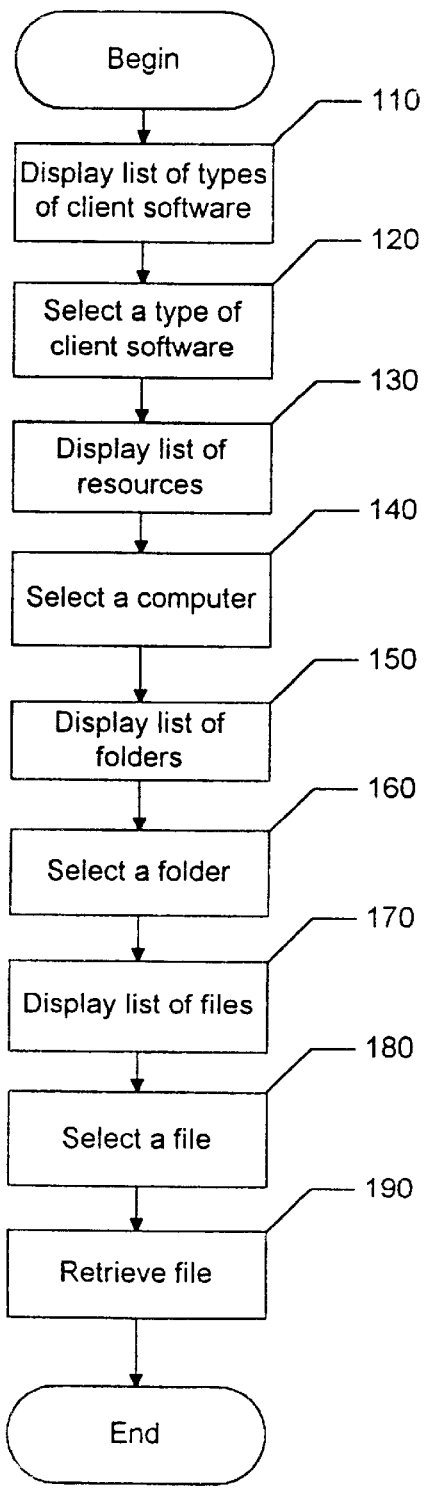
FIG. 1 is a high-level flowchart illustrating the steps required to access a file on a common prior art network.
Figure 10:
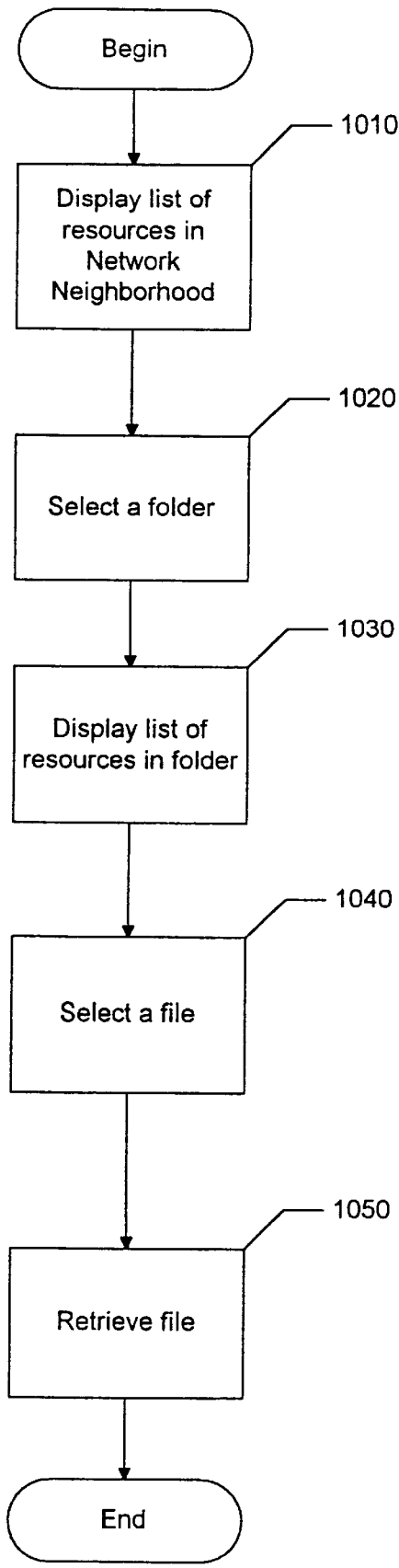
FIG. 10 is a high-level flowchart illustrating the steps required to access a file with the Network Neighborhood.
Figure 11:
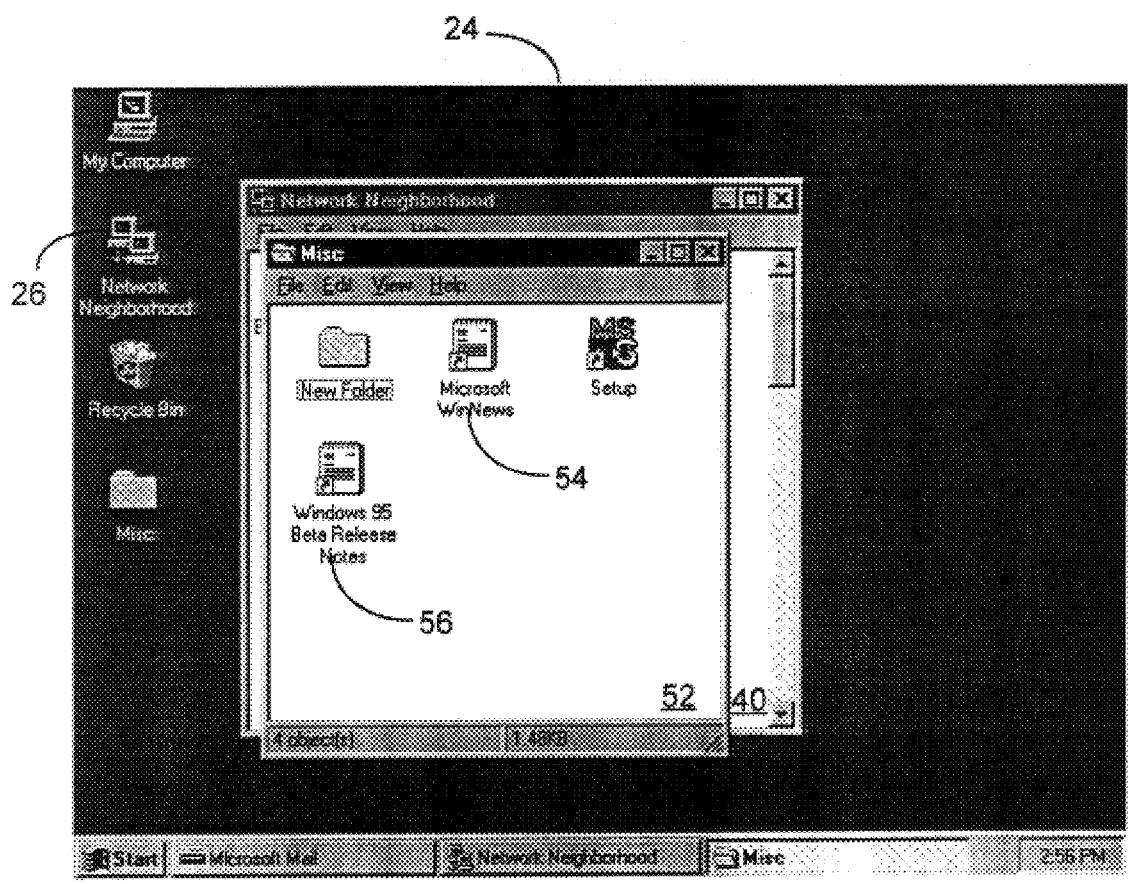
FIG. 11 is a video display showing the Network Neighborhood window of FIG. 5 after the user has selected a folder in the Network Neighborhood.

For example, the steps required to access a file with the Network Neighborhood when the folder in which the file is located is in the Network Neighborhood window are illustrated in FIG. 10. In step 1010, the computer system displays a list of network resources available in the Network Neighborhood (as shown in window 40 in FIG. 9). In step 1020, the user selects a particular folder (e.g., folder 48 in FIG. 9). In step 1030, the computer system displays a list of network resources available in the selected folder (as shown in window 52 in FIG. 11). In step 1040, the user selects a particular file (e.g., file 54 or file 56 in FIG. 11). In step 1050, the computer system retrieves the selected file for the user. In contrasting these steps with those required for a common prior art network (as illustrated in FIG. 1), one can see that the Network Neighborhood enables users to more easily connect to, browse, and access network resources.

Lastly, while the Network Neighborhood provides a constrained view of the network in a NOS-independent manner, there may be times when a user will need to browse the entire network. Specifically, the user will need to browse the entire network when the user wants to access a network resource that was not determined to be interesting to the user (and thus, was not initially displayed in the Network Neighborhood). In that situation, while it is not sufficient to provide a constrained view of the network in a NOS-independent manner (because the user needs to browse the entire network), the Network Neighborhood can provide an entire view of the network in a NOS-independent manner. As discussed above in detail, the Network Neighborhood provides this view in a NOS-independent manner by displaying all of the network resources in a consistent manner, regardless of the type of client software that was used to enumerate or discover the network resources. The Network Neighborhood window 40 includes an icon 58 labeled "Entire Network" (as shown in FIG. 9). The user can select the Entire Network by double-clicking on the icon 58. When the user selects the Entire Network, the Network Neighborhood displays all of the network resources enumerated or discovered by all types of client software installed on the client, grouped together by type or by some other means (e.g., alphabetical ordering), using a consistent visual representation.

One of ordinary skill in the art will now appreciate that the present invention provides a method and system for connecting to, browsing, and accessing computer network resources. Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed and desired to be secured by United States Letters Patent is:

1. In a distributed system having a client computer, a video display, a first network having resources and running a first network operating system, and a second network having resources and running a second network operating system that differs from the first network operating system, a method for providing a unified display of resources on the first network and the second network comprising the computer implemented steps of:

providing a first network client program at the client computer for interfacing with the first network, said first network client program including a means for enumerating the resources in the first network;

providing a second network client program at the client computer for interfacing with the second network, said second network client program including a means for enumerating the resources in the second network;

with the first network client program, enumerating a subset of less than all of the resources on the first network as being resources of interest to the user;

with the second network client program, enumerating a subset of less than all of the resources on the second network as being resources of interest to the user; and displaying a single window to the user on the video display to show a list of network provided resources, said single window providing a visual representation comprising a unified display of the resources enumerated by the first network client program and the second network client program.

2. The method of claim 1 wherein the step of enumerating a subset of less than all of the resources on the first network comprises the step of enumerating a hierarchical logical organization of the resources.

3. The method of claim 1 wherein the resources have names and the step of displaying the single window to the on the video display comprises the step of displaying an alphabetically sorted list of the names of the resources in the subset on the video display.

4. The method of claim 1, further comprising the step of displaying all of the resources in the distributed system on the video display.

5. The method of claim 1, further comprising the step of enabling the user to access a selected resource in response to the user selecting the selected resource through the visual representation provided in the single window.

6. The method of claim 1 wherein the step of enumerating a subset of less than all of the resources in the first network comprises the step of identifying ones of the enumerated resources in the first network that were most recently used by the user to be in the subset of the enumerated resources to display to the user.

7. The method of claim 1 wherein the step of enumerating a subset of less than all of the resources in the first network comprises the step of identifying selected ones of the enumerated resources in the first network that were most frequently used by the user to be in the subset of the enumerated resources to display to the user.

8. The method of claim 1 further comprising the step of receiving input data representing a resource added by a user to the list of network provided resources, wherein a visual representation of the resource added by the user is also displayed in the window.

9. The method of claim 1 wherein the first network client program uses a different approach to enumerating resources than the second network client program uses.

10. In a distributed system having network resources that include a video display, a client machine running client software of a given type, a first network having network resources and running a first network operating system and a second network also having network resources and running a second network operating system that differs from the first network operating system, a method comprising the computer-implemented steps of:
- determining with the client software which of the network resources are to be included in a constrained view of the distributed system that is to be displayed to a user, said constrained view including less than all of the network resources and including network resources from both the first network and the second network; and
- with the client software, displaying the constrained view on the video display, said constrained view providing a uniform view of the determined network resources such that it is not apparent which network operating systems are run on the networks in the constrained view.

11. The method of claim 10 wherein the client machine runs multiple types of client software and wherein the step of determining which network resources are to be included in the constrained view includes the step of having each type of client software determine which of the network resources are to be included in the constrained view.

12. The method of claim 11 wherein each type of client software includes an approach to enumerating network resources for at least a portion of the distributed system and each type of client software determines which network resources are to be included in the constrained view based upon the method provided by the client software for enumerating network resources.

13. The method of claim 11 wherein the step of determining which network resources are to be included in the constrained view comprises the steps of determining which of the network resources have been most recently used by the user and including the network resources that have been determined to be most recently used by the user in the constrained view.

14. The method of claim 11 wherein the step of determining which network resources are to be included in the constrained view comprises the steps of determining which of the network resources have been most frequently used by the user and including the network resources that have been determined to be most frequently used by the user in the constrained view.

15. The method of claim 10 wherein the step of determining which of the network resources are to be included in the constrained view comprises the step of having the user determine which of the network resources are to be included in the constrained view.

16. The method of claim 10 wherein the network resources are of different types and wherein the step of displaying the constrained view includes the step of displaying all networks resources of a type in the constrained view so that they appear grouped together.

17. The method of claim 10, further including the step of enabling the user to access the displayed network resources in the constrained view.

18. The method of claim 10 wherein the network resources included in the constrained view include servers and wherein the step of displaying the constrained view includes displaying a like visual representation for each of the servers that is included in the constrained view.

19. The method of claim 10 wherein the client machine runs an operating system and the client software is part of the operating system.

20. In a distributed system having a first network having resources and running a first network operating system and a second network having resources and running a second network operating system that differs from the first network operating system, a system comprising:
- a video display;
- a client computer;
- a first network client program run on the client computer for interfacing the client computer with the first network, wherein the first network runs a first network operating system, said first network client program comprising:
  - means for enumerating a first subset of less than all of the resources in the first network;
- a second network client program run on the client computer for interfacing the client computer with the second network, wherein the second network runs a second network operating system that differs from the first operating system, said second network client program comprising:
  - means for enumerating a second subset of less than all of the resources in the second network; and
- a user interface generator for providing a visual representation of the first subset and the second subset on the video display in a single window.

21. The system of claim 20, further comprising means for selecting and accessing one of the resources via the visual representation provided on the video display.

22. The system of claim 20 wherein the means for enumerating a subset of less than all of the resources in the first network enumerates those resources that have been most recently used by the user.

23. The system of claim 20 wherein the means for enumerating a subset of less than all of the resources in the first network enumerates those resources that have been most frequently used by the user.

24. In a distributed system having a client computer, a video display, a first network having resources and running a first network operating system, and a second network having resources and running a second network operating system that differs from the first network operating system, a computer program product for implementing a method of generating a unified display of resources on the first network and the second network, the computer program product comprising:
- computer-executable instructions for implementing said method, said computer-executable instructions including:

program code means, at the client computer, for interfacing with the first network, including means for enumerating the resources in the first network;

program code means, at the client computer, for interfacing with the second network, including means for enumerating the resources in the second network;

program cod means for enumerating a first subset of less than all of the resources on the first network as being resources of interest to the user;

program code means for enumerating a second subset of less than all of the resources on the second network as being resources of interest to the user; and program code means for displaying a single window to the user on the video display to show a list of network provided resources, thereby generating a unified display of the first subset and the second subset; and a computer-readable medium for carrying said computer-executable instructions.

25. The computer program product of claim 24 wherein the program code means for enumerating a subset of less than all of the resources in the first network selects ones of the enumerated resources in the first network that were most recently used by the user to be in the subset of the enumerated resources to display to the user.

26. The computer program product of claim 24 wherein the program code means for enumerating a subset of less than all of the resources in the first network selects ones of the enumerated resources in the first network that were most frequently used by the user to be in the subset of the enumerated resources to display to the user.

27. The computer program product of claim 24 wherein the means for enumerating the resources in the first network uses a different approach to enumerating resources than does the means for enumerating the resources in the second network.

28. The computer program product of claim 24 further comprising program code means for permitting a user to add a resource to the list of network provided resources, wherein a visual representation of the resource added by the user is also displayed in the window.

29. In a distributed system having network resources that include a video display, a client machine running client software of a given type, a first network having network resources and running a first network operating system and a second network also having network resources and running a second network operating system that differs from the first network operating system, a computer program product for implementing a method of generating a unified display of resources on the first network and the second network, the computer program product comprising:

computer-executable instructions for implementing said method by executing the steps of:

determining which of the network resources are to be included in a constrained view of the distributed system that is to be displayed to a user, said constrained view including less than all of the network resources and including network resources from both the first network and the second network; and displaying the constrained view on the video display, said constrained view providing a uniform view of the determined network resources such that it is not apparent which network operating systems are run on the networks in the constrained view; and a computer-readable medium for carrying said computer-executable instructions.

30. The computer program product of claim 29 wherein the client machine runs multiple types of client software and wherein the step of determining which network resources are to be included in the constrained view includes the step of having each type of client software determine which of the network resources are to be included in the constrained view.

31. The computer program product of claim 29 wherein the step of determining which network resources are to be included in the constrained view comprises the steps of determining which of the network resources have been most recently used by the user and including the network resources that have been determined to be most recently used by the user in the constrained view.

32. The computer program product of claim 29 wherein the step of determining which network resources are to be included in the constrained view comprises the steps of determining which of the network resources have been most frequently used by the user and including the network resources that have been determined to be most frequently used by the user in the constrained view.

* * * * *